United States Patent [19]

Swain et al.

[11] 3,895,003

[45] July 15, 1975

[54] PROCESS FOR PRODUCING PROTEIN CONCENTRATE USING AIR CLASSIFICATION

[75] Inventors: Ronald Bruce Swain, Cincinnati, Ohio; David Evans O'Connor, Lake Hiawatha, N.J.

[73] Assignee: The Procter & Gamble Company, Cincinnati, Ohio

[22] Filed: June 7, 1973

[21] Appl. No.: 368,009

Related U.S. Application Data

[63] Continuation of Ser. No. 156,650, June 25, 1971, abandoned.

[30] Foreign Application Priority Data

June 23, 1972 Canada .............................. 145542

[52] U.S. Cl. .............. 260/123.5; 426/312; 426/364; 426/375; 426/430; 426/431; 426/463; 426/464; 426/475; 426/484
[51] Int. Cl. ............................................. A23j 1/14
[58] Field of Search .................................. 260/123.5

[56] References Cited
UNITED STATES PATENTS 2,635,094 4/1953 Belter et al. ..................... 260/123.5
2,881,076 4/1959 Sair ................................. 426/364 X
3,218,307 11/1965 Eldridge et al. ................. 260/123.5

OTHER PUBLICATIONS

J. of Am. Oil. Chemists' Society, 1948, pp. 7–11, Beckel et al.
J. of Am. Oil Chemists' Society, 1955, pp. 390–397, Teeter et al.
American Miller and Processor, 1960, pp. 11–13 and 24, Pfeifer et al.
J. Agricultural and Food Chemistry, Vol. 11, 1963, Eldridge et al.

*Primary Examiner*—Howard E. Schain

[57] ABSTRACT

A process for producing a protein concentrate which comprises the steps of fine grinding an oilseed meal, making a first air classification of the meal and removing a 60 to 90% by weight fines fraction, ultra-finely milling the fines fraction to where 90% of the particles are less than 20 microns in diameter, making a second air classification of the milled fraction and removing a coarse fraction of 50 to 90% by weight, and washing the coarse fraction in water at pH 4 to 6 or in a 20 to 80% by weight aqueous alcohol solution. In a preferred embodiment of this invention, the ultra-fine milling operation is carried out in a fluid energy mill.

8 Claims, 1 Drawing Figure

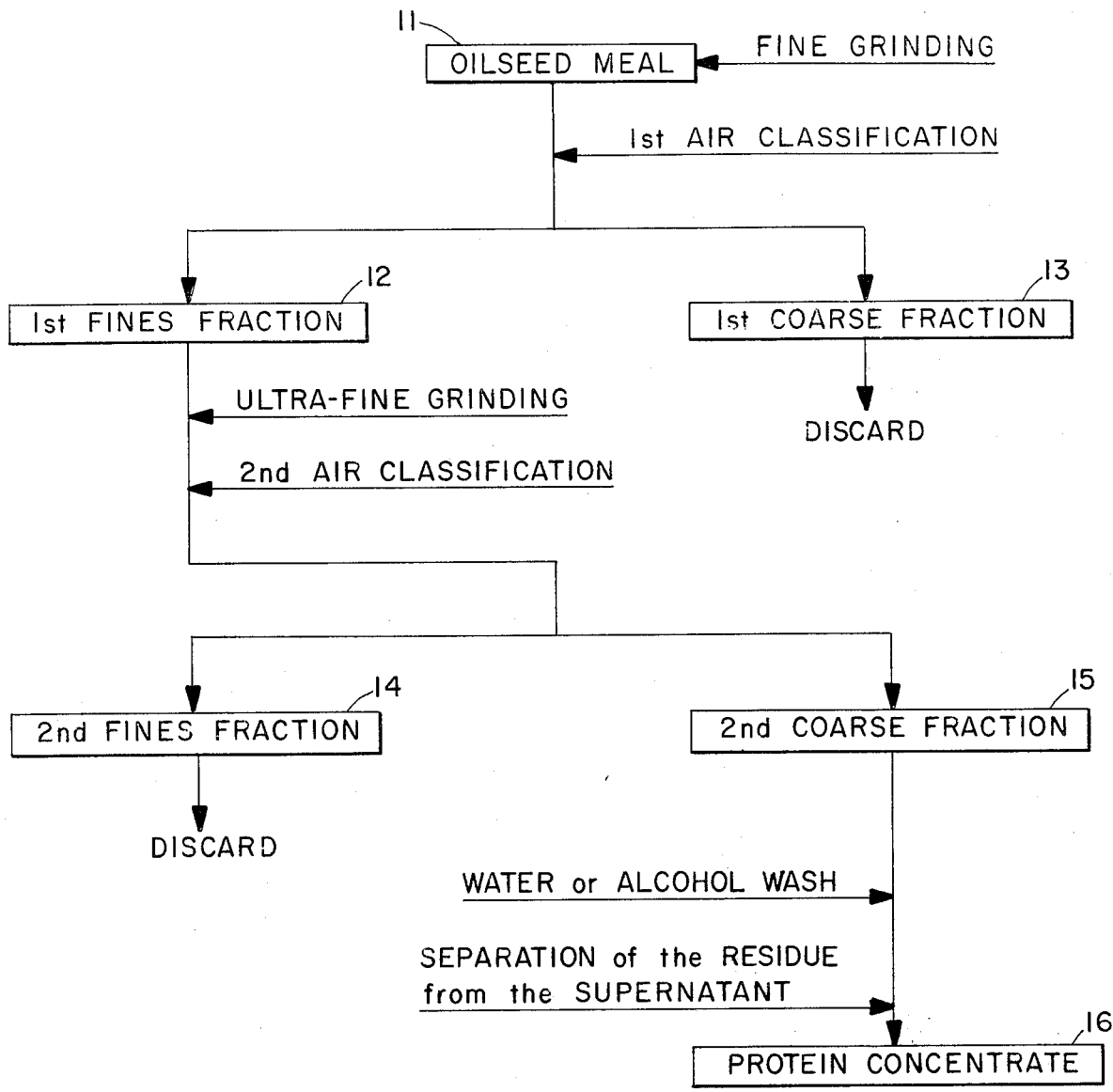

PROCESS FOR PRODUCING PROTEIN CONCENTRATE USING AIR CLASSIFICATION

CROSS REFERENCE

This application is a continuation of commonly assigned copending application, Ser. No. 156,650 filed June 25, 1971, and now abandoned.

BACKGROUND OF THE INVENTION

The field of this invention is oilseed meal protein concentrates. More specifically, this invention is related to the production of protein concentrates from soy, cottonseed, and sunflower seed meals. Oilseed meals have long been known to be a source of nutritional protein materials. For instance, because of its low cost and high nutritional value, especially in essential protein, it is a generally recognized fact that the soybean is one of the best and cheapest sources of food energy in terms of calories per unit cost of production, provided it is consumed directly. The greatest obstacle to the general use of soybeans as a source of human food products is the bitter, beany taste and objectionable odor and color of such products when prepared by prior art methods. Another objection to soybean food products is their poor keeping qualities and their tendency to become rancid in ordinary storage. In spite of these problems the soybean has been an important source of food to the Asiatic peoples for many centuries.

Cottonseed flour has been used as a food source for a long time. However, its use has been limited because of the chrome color it imparts to foods to which it is added and the somewhat bitter flavor of the product, attributable to the inactivated gossypol pigment, and had generally been eliminated from consideration as a protein source for high protein foods. However, recent developments such as the production of a bland light-colored flour from glandless cottonseed and the development of a low cost process for separating gossypol pigment glands from the protein-containing part of the cottonseed, has made it possible for cottonseed protein to be used in high protein foods.

One known method for increasing the protein content of oilseed meals comprises fine grinding and air classification of the oilseed meal. "Fractionating Corn, Sorghum and Soy Flours by Fine Grinding and Air Classification," by V. F. Pfeiffer, A. C. Stringfellow, and E. L. Griffin, Jr., American Miller and Processor, August 1960, pages 11–13, 24, shows that soy flour can be concentrated to a certain extent by passing it through an air classifier and taking off the fines fraction. Water-washing and alcohol-washing are also known methods for producing protein concentrates from oilseed meals. U.S. Pat. No. 2,881,076, "Proteinaceous Soy Composition and Method of Preparing" by Louis Sair, patented Apr. 7, 1959, discloses a process for treating defatted soybean material with water at pH 4.0 to 4.8 to produce a high-yield soy product. "Alcohol Washing of Soybean Protein", by A. C. Eldridge, W. J. Wolf, A. M. Nash, and A. K. Smith, Agricultural and Food Chemistry, July–August 1963, pp. 323–328, discloses alcohol washing of soybean protein to increase the concentration and improve the flavor of the protein. These references do not disclose the combination of air classification, fine grinding, and water-washing or alcohol-washing to produce a highly concentrated protein concentrate.

Commonly assigned, copending application, "Process for Producing Protein Concentrate (Case I)", filed concurrently herewith, describes a method for producing highly concentrated protein concentrates comprising air classifying and water-washing or alcohol-washing of oilseed meals. The combination of these two processes with ultra-fine milling is not disclosed in that application.

It is an object of the present invention to produce protein concentrates from oilseed meals which are more concentrated than any such protein concentrates that have been produced up to this time. It is a further object of this invention to produce protein concentrates from oilseed meals which are relatively colorless and have a low flavor level.

SUMMARY OF THE INVENTION

Briefly stated, in this invention air classification of a finely ground oilseed meal is combined with ultra-fine grinding and water-washing or alcohol-washing of the meal to produce a protein concentrate with a higher protein content than could be previously obtained. This process is specifically applicable to soy, cottonseed, and sunflowerseed meals. In a preferred embodiment, the oilseed meal is finely ground, air classified to produce a 60 to 90% by weight fines fraction, ground so that 90% of the particles are less than 20 microns in diameter, air classified to produce a coarse fraction of 50 to 90% by weight, and washed in water at pH 4 to 6 or in a 20 to 80% by weight aqueous alcohol solution.

BRIEF DESCRIPTION OF THE DRAWING

The FIGURE herein is a block diagram flow chart outlining the instant process of obtaining a protein concentrate from an oilseed meal.

DETAILED DESCRIPTION OF THE INVENTION

The oilseed meal for use in this process can be derived from seeds or beans by any convenient method. For example, soybeans can be solvent extract in processes described at pages 663 through 713 of Bailey's Industrial Oil and Fat Products, Third Edition (1964), John Wiley and Sons, New York. The residue left after the solvent extraction is soy meal suitable for use in this invention. There are many well known methods for obtaining meals from the other oilseed products.

First, the oilseed meal is finely ground so that 90% of the particles are at least less than 100 microns in diameter, such as a pin mill. The ground meal is then air classified to produce a fines fraction, containing the finer particles in the ground meal (usually 90% less than 45 microns in diameter for the first air classification step), and a coarse fraction, containing the larger particles in the meal. Air classifiers usually involve feeding the particles into a rotor by means of mixing them with an air stream which flows directly through the rotor. The centrifugal force supplied by the rotor moves the coarse particles to the wall of the rotor. The fine particles go through the rotor with the air stream because they have a smaller mass to size ratio. The air flow rate and the rotor speed are important variables which vary depending upon the material being separated and the air classifier being used. Generally, the fines fractions will be higher in protein concentration. The fine grinding and air classification may be accomplished by any convenient method. For example, "Fractionating Corn, Sorghum and Soy Flours by Fine Grinding and Air Classification", by V. F. Pfeiffer, A. C. Stringfellows, and E. L. Griffin, Jr., referred to above, discloses one known method for carrying out the fine grinding and air classification.

Referring to the drawing, the oilseed meal 11 is finely ground so that 90% of the particles are at least less than 100 microns in diameter. Then, the ground meal is subjected to the first air classification step to produce a 60 to 90% by weight first fines fraction 12 and a first coarse fraction 13 which is discarded or recycled. The 60 to 90% range is important because it allows the best balance between yield and high protein concentration. As the desired protein concentration is increased, the amount of concentrate that can be obtained decreases.

The first fines fraction 12 from above is then ultra-finely ground, preferably in a fluid energy mill, so that 90% of the particles are less than 20 microns in diameter. A vibration energy mill or other suitable apparatus may also be used. A larger size limitation will now allow a good separation in the following air classification step.

The ultra-finely ground meal is then subjected to a second air classification step. A second coarse fraction 15 of 50 to 90% by weight is removed. The second fines fraction 14 is discarded or recycled. The 50 to 90% range is important because it allows the best balance between yield and hidh protein concentration. The second coarse fraction 15, which is the ultimate product of the two air classification steps, should constitute about 30 to 80% by weight of the original starting meal and preferably about 40 to 60%. If the two air classification steps are carried out at the above-described conditions, the ultimate product will fall within the 30 and 80% range. Again, this range provides the best balance between yield and high concentration. If higher yields are obtained, the protein level is reduced. It is possible to obtain very high protein concentrations, but the small yield makes it uneconomical to do so.

The second coarse fraction 15 is then washed in water at pH of 4 to 6 or in a 20 to 80% by weight aqueous alcohol solution selected from the group consisting of methanol, ethanol, and isopropanol solutions. The pH range is important because this is the range at which the major part of the protein is insoluble. The solvent to meal ratio is preferably from 4:1 to 20:1. The solid protein-containing concentrate 16 can be separated from the liquid supernatant by filtration, centrifugation, or any other convenient method. For soy meal it is preferred that the pH of the water be from 4 to 5 and for cottonseed meal it is preferred that the pH of the water be from 4.5 to 5.5. This process can produce a soy protein concentrate which contains 80 to 85% protein or a cottonseed protein concentrate which contains from 80 to 90% protein.

The prior art shows that in air classification separation processes, the protein generally was considered to be contained in the fines fraction. The coarse fraction was thought to contain larger undesirable materials. To obtain a concentrate with even less undesirable materials, the first fines fraction would be air classified again, and this time a second coarse fraction containing the protein would be taken off. The second fines fraction contained some of the finer undesirable materials. In the present invention, the fines fraction from the first air classification step, the first fines fraction 12, is ultra-finely ground and then air classified again. The protein is contained in the coarse fraction of this second air classification, i.e. the second coarse fraction 15. It is theorized that the undesirable materials left in the first fines fraction after the first air classification step, which normally are not separated from the protein during this step, are separated from the protein during the second air classification step when the first fines fraction is ground to an ultra-fine particle size before it is air classified the second time. It is an unexpected result of the process of this invention that the ultra-fine grinding step reduces the size of the undesirable material much more than the protein material, thus allowing the separation of the more coarse protein particles by air classification.

The combination of the above described steps unexpectedly produces protein concentrates which are light-colored, bland in flavor, more concentrated than previously produced protein concentrates, and which contain a higher percentage of soluble protein than previously produced concentrates. The present invention allows the production of a more highly concentrated protein concentrate than any of the steps could produce alone.

The protein concentrates produced by the process of this invention can be added as protein supplements to food products. The food products will not be characterized by any off-flavor. Furthermore, since the protein concentrates are more concentrated than previous protein concentrates, less material can be added to the food products to obtain the same protein level. The texture and appearance of the protein-supplemented foods will be better than those of previous protein-supplemented foods because less material that is not naturally present in the food need be added. The fact that the protein concentrates produced by the process of this invention contain a higher percentage of soluble protein means that the concentrates can be more easily adapted to various uses than could previous concentrates. For example, the protein concentrated by the process of this invention can be utilized in breakfast cereals, meat products, peanut butter, imitation dairy products, pet foods, or snack foods and the like, as a protein supplement thereto without changing the appetizing appearance or flavor of these food products The following examples further illustrate the novel process herein and are intended only to illustrate the invention and not to limit it in any way.

EXAMPLE I

A sample of Hyzyme soy flour (Central Soya) is finely ground so that 90% of the particles are less than 60 microns in diameter using an Alpine Kolloplex 160 mill. After milling, the sample is air classified using an Alpine 100 MZR laboratory air classifier to yield a 74.4% first fines fraction in which 90% of the particles are less than 40 microns in diameter and a 25.6% first coarse fraction (C). The air flow rate is 45.25 cubic meters per hour and the rotor speed is 4750 revolutions per minute. The first fine fraction is milled to a particle size of 90% less than 15 microns in diameter and 40% less than 4 microns in diameter using a Trost T-15 fluid energy mill at a feed rate of 100 grams/min. This milled sample is again air classified to yield a 46% second fine fraction (A) and a 54% second coarse fraction (B) in which 90% of the particles are less than 15 microns in diameter but only 10% are less than 4 microns in diameter. The air flow rate is 37 cubic meters per hour and the rotor speed is 13,000 revolutions per minute. Analysis gives the following. The nitrogen content is multiplied by 6.25 to obtain the % protein.

| Fraction | % Yield | % Protein (6.25N) |
|---|---|---|
| Second Fine (A) | 33.5 | 50.5 |
| Second Coarse (B) | 40.9 | 63.7 |
| First Coarse (C) | 25.6 | 50.4 |
| Soy Flour | | 57.0 |

Samples of each of these fractions are then washed at room temperature for 1 hour with water at pH 4.5 using a 10:1 water:meal ratio. The mixture is centrifuged and the recovered residue is rewashed in the same way using a 5:1 water:meal ratio. The residue is again recovered by centrifugation and is then freeze dried and analyzed. The results of the washing are:

| Fraction | % Yield | % Protein |
|---|---|---|
| Second Fine (A) | 68 | 65.9 |
| Second Coarse (B) | 72 | 82.4 |
| First Coarse (C) | 67 | 63.3 |
| Soy Flour | 68 | 73.0 |

The second coarse fraction, which represents the result of the total process of this invention, contains 82.4% protein. The advantages to be gained from the practice of the present invention can be seen from closely examining the effects of air-classification and water-washing separately on the meal and then comparing the results expected from a combination of the two steps with the results actually obtained in the practice of the present invention. In examining the data, the decrease in non-protein matter is the significant criteria, since this is what is sought to be removed by the instant process. Taking the Second Coarse (B) fraction, the fraction with the highest protein concentration, it can be seen that air classification alone decreases the non-protein content 15.6%, based on the percent non-protein matter in the starting soy flour. This is obtained by substracting the percent protein from 100% to obtain the percent non-protein for each of the starting soy flour and Second Course (B) fraction to obtain the percent non-protein matter in each sample, then taking the difference between these percentages of non-protein matter and dividing this difference by the percent non-protein matter in the starting soy flour, or 100%−57.0% = 43.0%; 100%−63.7% = 36.3%; 63.7%−36.3% = 6.7%; and, (6.7%/43.0%) × 100% = 15.6%. To find the percent decrease in nonprotein matter from water-washing alone, a similar calculation is employed, except that the "Soy Flour" data from the second table is used instead of the Second Coarse (B) fraction data. Numerically, this is done as follows: 100%−73.0% = 27.0% for the percent non-protein matter in the water-washed soy flour; 100%−57.0% = 43.0% for the percent non-protein matter in the starting soy flour; %−%−27.0% = 16.0% for the absolute decrease in non-protein matter and, (16.0%/43.0%) × 100% = 37.2% decrease in non-protein matter due to water-washing alone based on the percent non-protein matter in the starting soy flour.

If the combination of the two steps were merely additive, one could predict the final non-protein concentration of a sample subjected to air-classification and water-washing, sequentially. From the calculations above, the percent reduction in non-protein matter for each of the air-classification and water-washing steps are known. Thus, the percent decrease for the combination of steps can be predicted by calculating the reduction for each step and then finding the overall percent reduction in non-protein matter. Since the starting soy flour contains a 57.0−43.0 cut (57.0% protein matter and 43.0% non-protein matter), air-classification yields a 63.7−36.3 expected cut, that is, reducing the non-protein matter 15.6% (43.0% × .156 [15.6%] = 6.7%, 43.0%−6.7% = 36.3%). Water-washing this air-classified cut would give an expected 77.2−22.8 cut, since water-washing alone gives a 37.2% further reduction in non-protein concentration (36.3% × 0.372 [37.2%] = 13.5%, 36.3%−13.5% = 22.8%). Thus, the expected overall decrease in non-protein concentration is 47.0% based on the concentration of non-protein matter in the starting soy flour (43.0%−22.8% = 20.2%, (20.2%/43.0%) × 100% = 47.0%).

But surprisingly, combining the air-classification and water-washing steps results in an actual 59.1% decrease in non-protein matter, based on the concentration of non-protein matter in the starting flour, for the second Coarse (B) fraction, which represents the total result of the process of the present invention (100%−82.4% = 17.6%, 43.0%−17.6% = 25.4%, (25.4%/43.0%) × 100% = 59.1%). This is 12.1% (59.1%−47.0%) over the expected decrease resulting from the two steps if they were merely additive.

EXAMPLE II

The mid fraction prepared as described in Example I is washed instead two times at room temperature with 70:30 (wt:wt) methanol:water solvent at a 10:1 solvent:meal ratio. The washed concentrate contains about 80% protein. A sample of soy flour washed in the same way contains about 74% protein.

If cottonseed meal or sunflowerseed meal are treated by the processes of Examples I and II, highly concentrated protein products are obtained.

What is claimed is:
1. A process for producing a protein concentrate which comprises the steps of
   a. fine grinding an oil seed meal so that about 90% of the particles have a particle size of less than about 100 microns in diameter.
   b. air classifying the meal in step (a) to produce a first fines fraction and a first coarse fraction and removing this first fine fraction which is 60 to 90% by weight of the ground meal and of which about 90% are of a size less than 45 microns in diameter,
   c. ultra-finely grinding the first fines fraction from step (b) so that 90% of the particles are less than 20 microns in diameter,
   d. air-classifying the ground first fines fraction from step (c) to produce a second fines fraction and a second coarse fraction and removing this second coarse fraction which is 50 to 90% by weight of the ground first fines fraction and of which at least about 80% of the particles are less than 20 microns in diameter, and
   e. washing the second coarse fraction with a solution selected from the group consisting of water at a pH of 4 to 6, and a 20 to 80% by weight aqueous alcoholic solution and separating a protein-containing residue from a liquid supernatant.

2. The process of claim 1 wherein the oilseed meal is selected from the group consisting of soy meal, cottonseed meal, and sunflowerseed meal.

3. The process of claim 2 wherein a fluid energy mill is used in step (c).

4. The process of claim 3 wherein step (e) comprises washing the coarse fraction from step (d) in water at a pH of 4 to 6.

5. The process of claim 3 wherein step (e) comprises washing the coarse fraction from step (d) in a 20 to 80% by weight aqueous alcohol solution selected from the group consisting of methanol, ethanol, and isopropanol solutions.

6. The process of claim 4 wherein step (a) comprises pin milling the oilseed meal so that 90% of the particles are less than 100 microns in diameter.

7. The process of claim 6 wherein oilseed meal is soy meal and said meal is washed in water at a pH of 4 to 5.

8. The process of claim 6 wherein the oilseed meal is cottonseed meal and said meal is washed at a pH of 4.5 to 5.5.

* * * * *